A. Lewenberg,
Molding Teeth.
N° 23,473. Patented Apr. 5, 1859.

Witnesses:
Lemuel W. Serrell
Thomas G. Harold

Inventor:
Aaron Lewenberg

UNITED STATES PATENT OFFICE.

AHRON LEWENBERG, OF NEW YORK, N. Y.

MOLD FOR FORMING ARTIFICIAL TEETH.

Specification of Letters Patent No. 23,473, dated April 5, 1859.

*To all whom it may concern:*

Be it known that I, AHRON LEWENBERG, of the city and State of New York, have invented, made, and applied to use a certain new and useful Improvement in Molding Artificial Teeth; and I do hereby declare that the following is a full, clear, and exact description of the construction and operation of the means I employ for this purpose, reference being had to the annexed drawing, making part of this specification, wherein—

Figure 2:
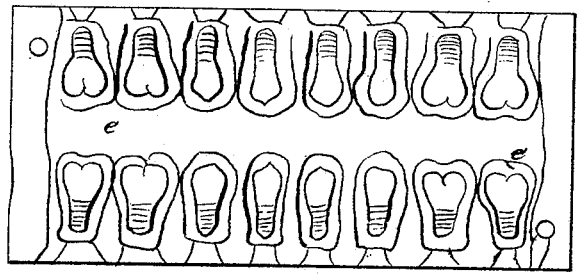
Figure 1:
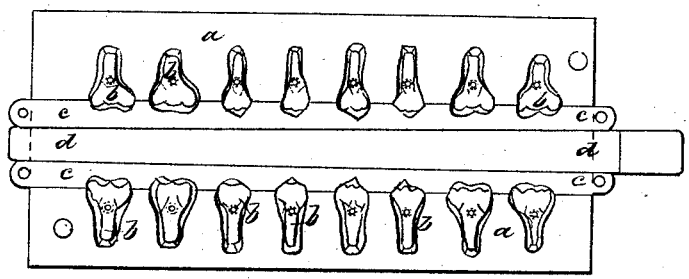
Figure 4:
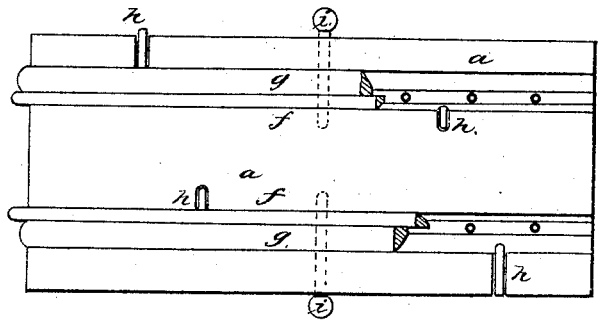
Figure 3:
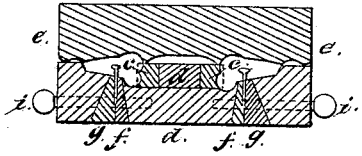

Figure 1, is a face view of the die for molding teeth, Fig. 2, is the counter die, Fig. 3, is a cross section of the dies at one of the teeth, and Fig. 4, is a back view of the die with some of the parts removed.

Similar marks of reference indicate the same parts.

The nature of my said invention consists in providing a divided socket receiving the pin or pins that are inserted in the teeth, whereby the socket is removed, and the pin or pins entirely liberated before the tooth is removed from the mold, thus avoiding the difficulties that have heretofore existed in molding artificial teeth particularly with long pins: for in all molds heretofore constructed the pins have been inserted in holes, and then the material forming the teeth pressed around the same when upon removing the tooth from the mold the pin will often be found remaining in the hole in consequence of being wedged or driven thereinto by the great pressure to which the material is subjected, thus the tooth would be spoiled and the mold is speedily injured by cleaning out of said holes, the oil and earthy matter that accumulates therein, and so difficult has been the insertion of pins in the molding, that they are now often introduced and plugged into holes drilled in the teeth previous to vitrification, particularly long or flat back pins.

In the drawing $a$, is the die containing the two ranges of molds $b$, $b$ fitted with the crown slides $c$, $c$, and wedged, in the usual manner for forming the teeth by pressure from the counter die $e$, and then removing the slides $c$, $c$ so that the crown part of the teeth will not be injured in their removal from the mold.

At the back of the molds I found a recess that receives the wedge shape piece $f$, the vertical edge of which is on the line of the pins in the molds, and has notches in its surface corresponding to the position of the pins and $g$ is a second wedge shape piece with notches in its vertical edge coinciding with those in the piece $f$.

$h$, $h$, are pins in the respective pieces $f$ and $g$ by which their position is determined and $i$, is a bolt passing through said pieces and retaining them into the die.

The operation is as follows: Insert the pieces $f$ and $g$ in the die and secure them by the bolt $i$, turn the die over and introduce the pins into the holes formed by the notches in the meeting faces of the pieces $f$ and $g$, then fill the molds and press as usual with the counter die, $e$, which forces the material thoroughly into the molds and around the said pins; then turn the mold over, draw out pin $i$, remove the piece $g$ and then the piece $f$, which leaves the pin entirely free and projecting from the tooth as seen in a portion of Fig. 4; and on removing the teeth in the usual manner the pins are not touched or loosened, because the strips $f$ and $g$ form the portion of the mold around said pins, thereby their removal leaves a large opening in the mold around the pin.

It will be thus seen that any size or shape of pin or pins can be introduced and that the same will be firmly embedded in the tooth when withdrawn from the mold; I am thus enabled to use long pins with flat backs for soldering onto the plate, or shorter ones for riveting, or long pins to be bent out diverging from each other for attaching by composition or enamel, or to introduce a staple through which the hand rubber or gutta percha now sometimes made use of, passes, as the same is molded around the teeth.

The pieces $f$ and $g$ might be fitted to slide on the die, instead of lifting out, or a divided socket to each tooth mold might be used although I prefer the device herein described and represented.

What I claim as my invention and desire to secure by Letters Patent is—

A divided socket or holder receiving the pins of artificial teeth, so fitted as to be removable from said pins prior to taking the teeth out of the mold for the purposes and as specified.

In witness whereof I have hereunto set my signature this first day of February 1859.

AHRON LEWENBERG.

Witnesses:
LEMUEL W. SERRELL,
THOMAS G. HAROLD.